June 9, 1936.  S. F. NEWMAN  2,043,862

THREADING DEVICE

Filed Oct. 15, 1934  2 Sheets-Sheet 1

INVENTOR.
S. F. Newman

BY
A. Yates Dowell
ATTORNEY.

June 9, 1936.   S. F. NEWMAN   2,043,862
THREADING DEVICE
Filed Oct. 15, 1934   2 Sheets—Sheet 2

INVENTOR.
S. F. Newman
BY
ATTORNEY.

Patented June 9, 1936

2,043,862

UNITED STATES PATENT OFFICE 2,043,862

THREADING DEVICE

Samuel F. Newman, Waynesboro, Pa., assignor to Landis Machine Company, Waynesboro, Pa., a corporation of Pennsylvania Application October 15, 1934, Serial No. 748,390

9 Claims. (Cl. 10—89)

This invention relates to threading devices for threading pipes, pipe couplings or other tubular members, and more particularly to threading devices having either the workholder or the thread cutting device floating or self-centering or aligning. The invention relates to threading devices in which a receding collapsing tap is provided for operating upon the work gripped and held against the action of thread cutting forces by a floating, self-aligning chuck. The invention also relates to a floating die head for external threading and provided with retractable threading elements for the purpose of cutting tapered threads.

With the devices of this character heretofore employed, efforts have been made to have the supporting and aligning of the work with the cutter head or tap to be borne by the sharp thread cutting teeth of the cutter head. This has been to a degree unsuccessful. It is objectionable on account of the wear and injury to the thread cutting teeth.

It is an object of this invention therefore, where the threading device or workholder is floating, to provide threading devices having means for supporting and aligning the work and the threading devices independently of the cutting teeth of the threading devices and thus relieving the cutters of everything except the threading operations.

In carrying out the present invention means are provided for supporting and aligning the work with the cutter head or tap prior to and during the thread cutting operation, said means comprising a projecting work-engaging member or the like.

Figure 1:
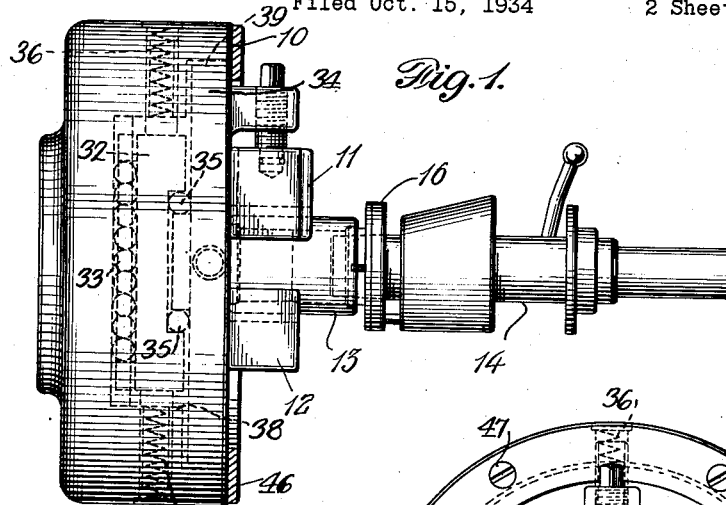
Figure 2:
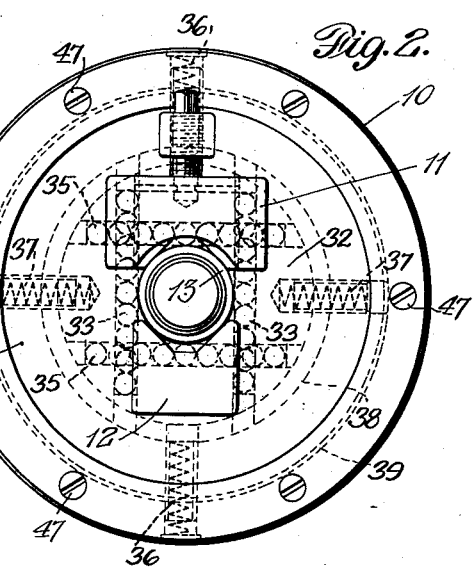
Figure 3:
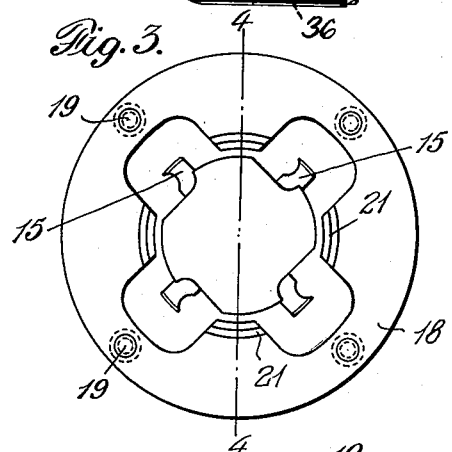
Figure 4:
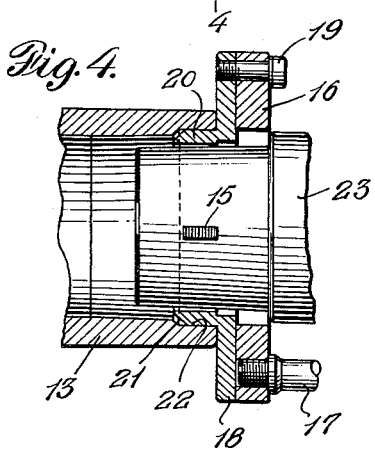
Figure 5:
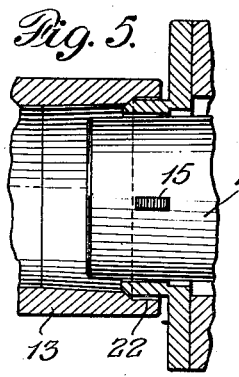
Figure 6:
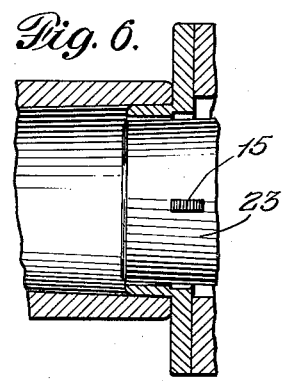
Figure 9:
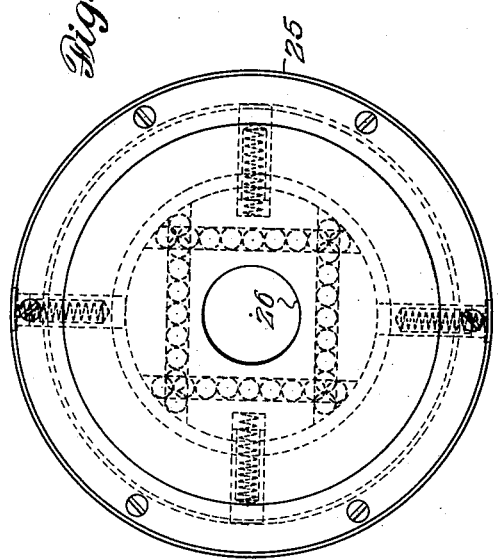
Figure 10:
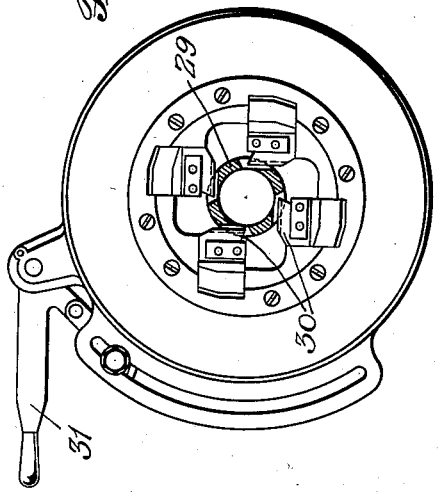
Figure 7:
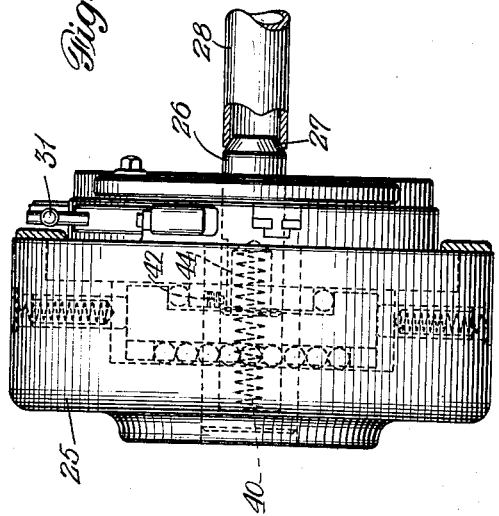
Figure 8:
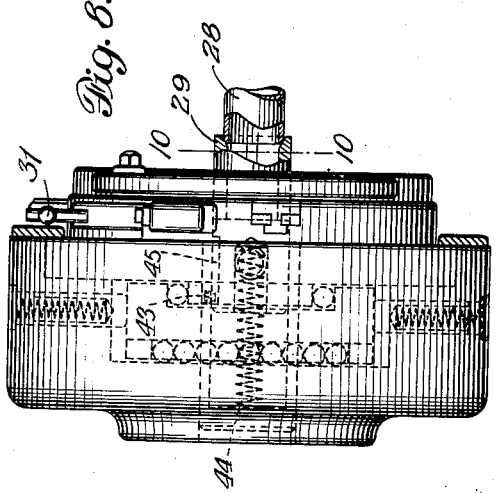

Further objects and advantages will be apparent from the following description taken in connection with the accompanying drawings wherein Fig. 1 is a side elevation of a floating chuck and receding collapsible tap in operative relation with a pipe coupling in a position to be internally threaded;

Fig. 2, a face view of the chuck looking from the right in Fig. 1;

Fig. 3, an end view of the tap of Fig. 1 looking from the left;

Fig. 4, a section on the line 4—4 of Fig. 3, showing the supporting ring and relation of the supporting lugs on said ring to the thread cutting chasers, with the lugs of the supporting ring bearing upon the counter-bore of the coupling and the end of the coupling engaging said ring to produce recession of the threading elements during threading of pipe or coupling;

Fig. 5, a similar sectional view with the aligning lugs engaging the bottom of the counter-bore of the coupling or work to produce recession of the threading elements;

Fig. 6, a similar section, but with the work having no counter-bore and the receding action of the threading elements produced by the engagement of the end of the coupling with the supporting ring;

Fig. 7, a side elevation of a floating die head for external threading of pipes and tubes, the work being internally engaged by an aligning member;

Fig. 8, a view similar to Fig. 7, except the work is externally engaged by an aligning member;

Fig. 9, an end elevation of the floating die head taken from the left of Fig. 7 or Fig. 8; and Fig. 10, a view taken on the line 10—10 of Fig. 8.

Referring to the drawings and particularly to Figures 1 to 6, a floating workholder or chuck 10 is provided which may be of any of a number of numerous types of constructions. The chuck 10 constitutes no part of the present invention. The chuck as shown may have a vertically movable member 32 movable on two sets of ball bearings 33 and carried by this vertically movable member is a horizontally movable member 34 similarly movable on sets of ball bearings 35. The movable members 32 and 34 are yieldingly centered in the chuck by means of pairs of springs 36 and 37 engaging their respective ends. A ring 46 secured to the chuck 10 by means of screws 47 maintains the members assembled therein. Jaws 11 and 12 are carried by the horizontally movable member 34 of chuck 10 for clampingly supporting a pipe coupling 13 or other work to be operated upon. This chuck is mounted to hold the work against the threading reaction but is designed to float and align the work it supports with a tap indicated generally at 14. It will be noted that members 32 and 34 have a limited play within the cylindrical portions 38 and 39 respectively of the chuck so as to permit sufficient movement of the work clamping jaws 11 and 12 with the work to center the work to align it with the tap.

The tap 14, having body portion 23, is of the type wherein the threading tools or cutters 15 are moved out of operative position or are receded by movement of an operating ring 16 having an operating connection 17 with collapsing means in the interior of the tap 14. Movement of the operating ring 16 relative to the body member of the tap is produced by engagement of the operating ring or associated element with the work.

In the present instance the operating ring 16 has associated therewith a work engaging ring 18 fastened to the ring 16 by suitable means such as bolts 19. The ring 18 is provided with supporting and guiding lugs 20 which extend into the work being operated upon and are transversely curved to fit the cylindrical bore of the work.

As shown in Fig. 3 the lugs 20 are spaced apart to permit disposal of the cutting portions 15 of the threading elements therebetween and as shown in Fig. 4 the supporting lugs 20 are adapted to fit the counter bore 22 of the work 13 and the work coming in contact with the ring 18 automatically causes recession of the chasers or cutting elements 15 during the axial travel of tap and chuck in relation to each other. When the desired length of thread is cut, collapse or withdrawal of the cutting elements from thread cutting position is effected.

Shown in Figure 5 is a modified arrangement providing a clearance between the counter bore and the lugs 20, the beveled extremity 21 of the lugs serving to center and support the work. Recession of the cutting elements is produced by the beveled end of the supports engaging the beveled bottom of the counter-bore.

Referring to Fig. 6 the work 13 has no counter-bore and the supporting lugs are of slightly smaller external diameter to engage the smooth bore of the work. In this embodiment the end of the work engaging the ring 18 produces recession of the cutters.

In operation the work having been fastened in position between the jaws of the floating chuck the collapsible cutters and chuck, either of which may be fixed and the other movable, are brought together and the supporting lugs 20 first engage the work and produce the necessary alignment and support before any cutting action is accomplished, thus relieving the cutting elements from the aligning and supporting during thread cutting and the consequent wear or injury.

The construction above described is intended to produce internal threading but the invention is not so limited but is adaptable to external threading and Figs. 7, 8, 9, and 10 are directed to this phase of the invention. Referring to these figures a floating die head 25 is provided with a work-engaging element 26 having a beveled extremity 27 for cooperatively internally engaging the flared or beveled extremity of a pipe or other work 28. The floating action of this die head is similar to that of the floating chuck 10 hereinbefore described.

Instead of the work-engaging element 26 shown in Fig. 7, a slotted work-engaging element 29 shown in Fig. 8 may be employed, the slots permitting projection of the chasers therethrough for engaging the work, the work-engaging element 29 being adapted to fit over or receive the end of the work as shown. These work-engaging elements 26 and 29 are slidingly mounted in the floating elements of the die head and are yieldingly held in their outermost positions as shown by means of springs 40 and 41 respectively which permit them to move inwardly of the die head when the work is in engagement therewith so that the work will enter the tap. Key elements 42 and 43 engaging slots 44 and 45 in the respective work engaging elements prevent them from rotating with respect to the die heads.

The cutter head 25 is provided with cutting elements or chasers 30 which are constructed to be moved by a lever 31. Any desired means may be provided for retracting the cutting elements.

With the constructions shown in Figs. 7 to 10 work is secured in a workholder, not shown, and the floating die head moved toward the work or the work is moved toward the die head until the work engaging element 26 or 29 comes in contact with the work and produces alignment and support of the parts so that the thread cutting operation can be performed.

It will be obvious to those skilled in the art that various changes may be made in my device without departing from the spirit of the invention and therefore, I do not limit myself to what is shown in the drawings and described in the specification, but only as set forth in the appended claims.

I claim:

1. A threading device comprising workholding means and a threading member, one of which is floating to thereby provide relative movement and automatic alignment of the members, one or more threading elements carried by the threading member, and means for supporting the work relative to the threading member independently and out of contact with the threading elements.

2. A threading device comprising work-holding means and a threading element in floating relation, and means independent of said threading element for supporting and aligning the same with respect to the work during the threading operation.

3. In combination a floating chuck adapted to hold a workpiece, a threading device having cutting teeth adapted to cut a thread on said workpiece and means independent of said teeth for maintaining the workpiece and threading device in alignment during the threading operation.

4. In combination a floating chuck for the workpiece, a threading device having cutting teeth, and a supporting guide element for engaging the work and maintaining the centering thereof as it is received and operated upon by the cutting teeth for relieving the teeth of the threading device from the aligning forces between the workpiece and the threading device during the threading operation.

5. A threading device comprising work-holding means and a threading member one of which is floating, thereby providing relative movement and automatic alignment therebetween, one or more threading elements carried by the threading member, said threading device comprising means for supporting the work during the threading operation so that the sharp teeth of the cutting element do not support the work.

6. In combination, a floating chuck, a threading member having sharp cutting teeth, and means for supporting the work carried by the chuck in a centered position with respect to the threading member independent of the cutting teeth during the thread cutting operation.

7. In combination with means for threading and means for supporting work to be threaded one of which is floating in order to align itself with the other, and means independent of the cutting elements for supporting and centering the work with respect to the threading member in a position for the cutting element to perform the cutting operation.

8. In a threading device having floating means for providing automatic alignment, means for supporting the work during the threading operation free of the cutting elements and for engaging and supporting the end of the work in alignment with the threading element and movable with the work axially with respect to the threading element and during the engagement of the threading element with the work.

9. A threading device comprising work holding means and a threading member laterally movable with respect to each other for centering the work during work threading operations, one or more threading elements carried by said threading member, and means mounted within the threading member independent of said threading elements for engaging and supporting the end of the work in alignment with the threading element and movable with the work axially with respect to the threading element during the engagement of the threading element with the work.

SAMUEL F. NEWMAN.